(No Model.)
J. T. RIDGWAY.
Automatic Attachments to Lathes for Cutting Rubber and other Rings.
No. 235,022. Patented Nov. 30, 1880.
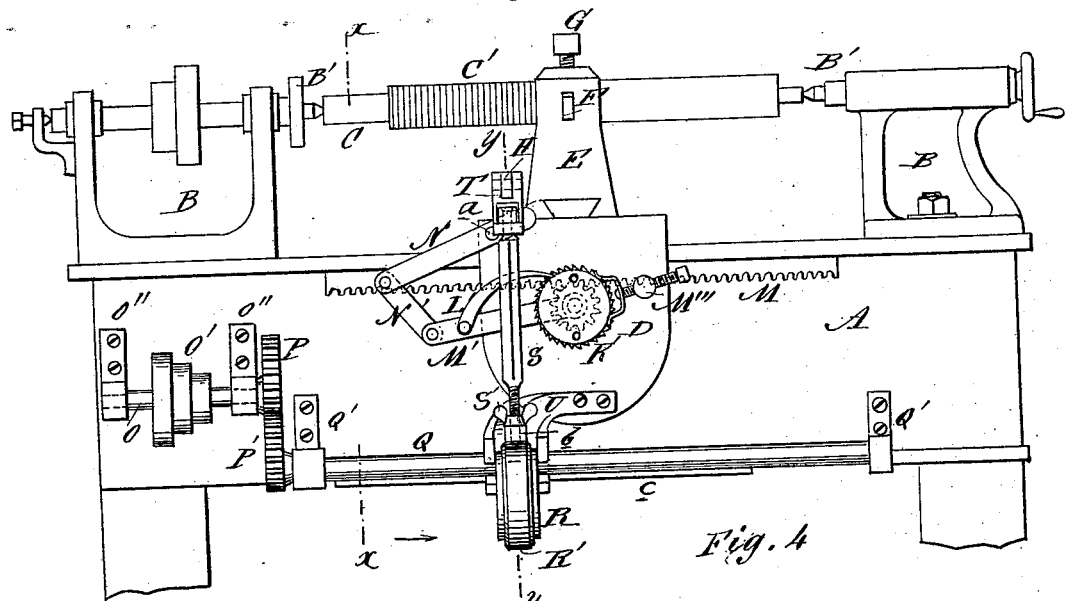
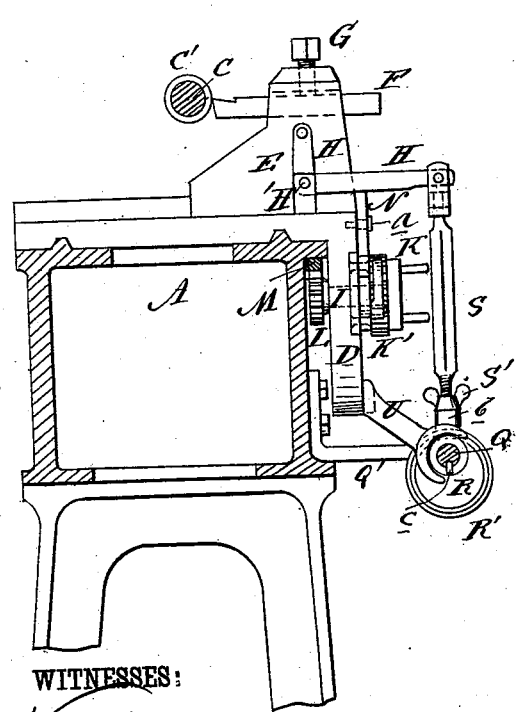
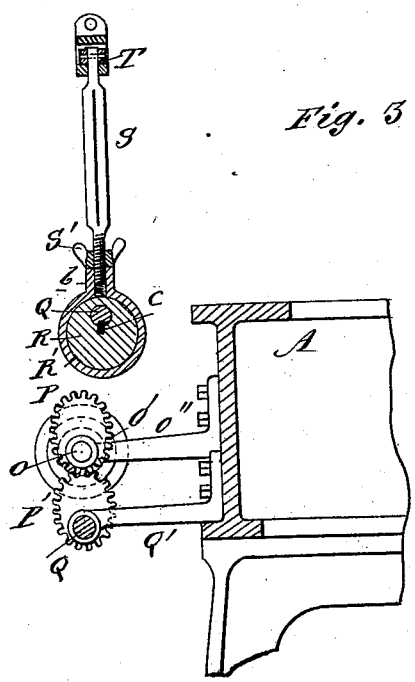
WITNESSES:
C. Neveux
C. Sedgwick
INVENTOR:
J. T. Ridgway
BY Munn & Co.
ATTORNEYS.
N. PETERS, PHOTO-LITHOGRAPHER, WASHINGTON, D. C.

UNITED STATES PATENT OFFICE.

JOSEPH T. RIDGWAY, OF TRENTON, NEW JERSEY.

AUTOMATIC ATTACHMENT TO LATHES FOR CUTTING RUBBER AND OTHER RINGS.

SPECIFICATION forming part of Letters Patent No. 235,022, dated November 30, 1880.

Application filed May 13, 1880. (No model.)

*To all whom it may concern:*

Be it known that I, JOSEPH T. RIDGWAY, of Trenton, in the county of Mercer and State of New Jersey, have invented a new and Improved Automatic Attachment to Lathes for Cutting Rubber and other Rings, of which the following is a specification.

The object of this invention is to make the lathe work more quickly and accurately by substituting automatic mechanism for mechanism operated by hand, thereby increasing and improving the product of the lathe and diminishing the cost of said product.

In cutting rubber rings for packing for fruit-jar covers and for other purposes, the rings are cut from a rubber tube carried by a wooden mandrel rotated between lathe-centers, by a cutting-tool supported by a tool-rest that is arranged to move parallel with the length of the tube, and the said tool-rest is fitted so as to be moved to and from the tube that is to be cut. Heretofore no provision has been made for quickening the return movement of the knife after each cut.

My invention is designed to supply a remedy for these defects; and it consists of a driving-shaft, elliptic gears, eccentric and eccentric-bearing shaft, slide-brace, and adjustable eccentric-rod, in combination with the tool-rest.

Figure 1 is a front elevation of a ring-cutting lathe with the improved device attached. Fig. 2 is a sectional end elevation of the same on line *x x*, Fig. 1, looking in the direction of the arrow. Fig. 3 is a sectional end elevation of the same on line *x x*, Fig. 1, looking in the opposite direction from the arrow. Fig. 4 is a sectional elevation on line *y y*, Fig. 1.

Similar letters of reference indicate corresponding parts.

In the drawings, A represents a lathe-bed, of any desired or usual character. B B are the lathe head and tail stocks, whose centers B' B' hold the mandrel C, over which is fitted a rubber tube, C', that is designed to be cut into rings. D is a slide fitted to traverse the lathe-bed A from one end to the other in a direction parallel with the mandrel C. E is the tool rest or holder, fitted to move forward and back upon the slide D; and F is the cutting tool, adjustably held in the tool-rest E by means of the set-screw G, that is preferably inserted downward through the top of the said tool-rest E.

The tool-rest E is moved forward and back by an elbow-lever, H, that is fulcrumed in a stud, H', on the slide D, the long arm of said lever H projecting in front of the lathe-bed A.

The overhanging portion of the slide D projects downward in front of the lathe-bed A, and serves as a bearing for an arbor, I, that passes through it from front to rear, and on the outer end of this arbor I is a hand-wheel, K, while on the inner end of the arbor I is a pinion, L, that meshes into the rack M, which is secured along the under side of the edge of the bed A, so that by turning the wheel K the slide D may be moved upon said bed A.

K' is a ratchet-wheel keyed to the arbor I, in rear of the wheel K, and L' is a pawl, which is hung on an arm, M', that works loosely on the arbor I.

N is a lever pivoted on a pin, *a*, on the slide D, and N' is a link connecting the outer end of the lever N with the free end of the pawl-carrying arm M'. When the arm M' is depressed the inner end of the lever N is raised in a position where it will be acted on and depressed by the end of the lever H, which said lever H is pressed down to draw back the cutting-tool F. This motion of the lever N operates, by means of the link N' and arm M', to move the ratchet-wheel K' one tooth at each motion, and consequently the slide D a certain distance lengthwise of the bed A, so that when the lever H is raised to force the tool rest or holder E inward a ring will be cut from the rubber tube that is about the mandrel C of a width equal to the distance moved by said slide D. This operation is continued, and rings thereby cut of uniform width.

M''' is a friction-brake bearing upon the hand-wheel K, to prevent any movement by momentum of the parts.

The parts above described are substantially the same as those now in use, and in such devices the lever H is operated by hand to move the cutting-tool F forward and back, which operation is slow and fatiguing and productive of inaccurate results.

In carrying out my improvement, a driving-shaft, O, provided with cone-pulleys O', for regulating the speed of the parts, is journaled in hangers O'', that are secured to the side of the lathe and project horizontally therefrom, and on one end of this shaft O is keyed an elliptic gear, P, which gears into an elliptic gear, P', that is keyed on the end of the shaft Q, which extends parallel with shaft O, and, like it, is journaled in hangers Q', that project from the lathe, said shaft Q being provided with a spline, $c$.

Fitted loosely on the shaft Q is an eccentric, R, having a keyway, $d$, and provided with a strap, R', having a screw-boss, $b$, into which boss $b$ the lower end of the eccentric-rod S is screwed, so that the length or throw of said rod S may be made adjustable by screwing said rod in or out in said boss $b$. S' is a lock-nut fixed on the lower and threaded end of said eccentric-rod S to lock it in position. The head of this rod S is swiveled in a link, T, that connects said rod with the lever H. The object of the screw and swivel on the eccentric-rod S is, after the cutting-tool is secured in the tool-rest, to lengthen or shorten said rod S, and thereby adjust the tool F according to the thickness of the rubber tube, so that said tool F shall cut through the rubber, but not cut the mandrel.

U is a slide brace or shifter that is secured to the bottom of the overhanging portion of the slide D, and, extending forward, embraces the eccentric-shaft Q on either side of the eccentric R, so that said slide D and eccentric R and connections are made to move laterally with each other, the engagement of the keyway $d$ of the eccentric R over the spline $c$ of the shaft Q enabling said eccentric to turn with said shaft Q while moving laterally at the same time.

To operate the device power is applied to the driving-shaft O and, through the elliptic wheels P P', to the shaft Q, which moves the eccentric R, and by means of the eccentric R motion is communicated, through the rod S, to the lever H, whereby the cutting-tool F is moved forward and back. These elliptic wheels P P' cause the speed of the shaft Q to be changed in each revolution thereof, so that at the moment of cutting the rubber tube C' on the mandrel C the cutting-tool F will move slowly and be withdrawn quickly, thereby greatly increasing the production of the lathe.

A slow motion of the cutting-tool is requisite when in the act of cutting the rubber rings, and in all other ring-cutting devices with which I am acquainted the cutting-tool is withdrawn at the same slow rate of speed, thereby involving great loss of time and production.

There is also great economy in the use of this device, every ring being cut through and no miscuts, as is the case when the knife or cutting-tool is moved by hand.

With this device attached to a lathe and using two mandrels, so that one is ready to be set in place with a rubber tube upon it when the other is taken out for the removal of the cut rings, a lathe may be constantly kept at work, and with such accelerated speed that twice as much can be done in a given time as can be performed in the usual way.

I do not limit myself to the exact details of construction, as they may be varied without departing from my invention.

I am aware that it is not new in machines for cutting rings to impart a uniform motion to the slide by a ratchet, pawl, and levers actuated by the lever which operates the tool-holder; but

What I claim is—

1. The combination, with a lathe for cutting rubber and other rings, of the driving-shaft O, elliptic gears P P', shaft and eccentric Q R, respectively, and eccentric strap and adjustable rod R' S, respectively, substantially as herein shown and described.

2. In a lathe for cutting rubber or other rings, the combination, with the slide D, tool-rest E, and lever H, of the shaft Q, eccentric and eccentric-strap R R', respectively, adjustable rod S, and slide-brace U, substantially as herein shown and described.

3. As a means for regulating the movement of the cutting-tool in a lathe for cutting rubber and other rings, the elliptic gears P P', in combination with the eccentric R, substantially as herein shown and described.

4. In a lathe for cutting rubber and other rings, the combination, with the slide D, of the brace U, eccentric R, provided with keyway $d$, and shaft Q, provided with spline $c$, substantially as and for the purpose described.

JOSEPH T. RIDGWAY.

Witnesses:
E. L. CAMPBELL,
PHILIP P. DEEMS.